US009432953B2

(12) United States Patent
Nishiguchi

(10) Patent No.: US 9,432,953 B2
(45) Date of Patent: Aug. 30, 2016

(54) DETECTION DEVICE, DETECTION SYSTEM AND DETECTION METHOD OF RADIO WAVE TRANSMITTING/RECEIVING BODY

(75) Inventor: Tadao Nishiguchi, Nagoya (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 1270 days.

(21) Appl. No.: 13/346,866

(22) Filed: Jan. 10, 2012

(65) Prior Publication Data

US 2012/0182122 A1    Jul. 19, 2012

(30) Foreign Application Priority Data

Jan. 13, 2011    (JP) ................................. 2011-005314

(51) Int. Cl.
| | |
|---|---|
| *G08B 29/00* | (2006.01) |
| *H04W 4/00* | (2009.01) |
| *H04W 52/28* | (2009.01) |
| *B60R 25/24* | (2013.01) |
| *H04B 17/27* | (2015.01) |

(52) U.S. Cl.
CPC .......... *H04W 52/283* (2013.01); *B60R 25/245* (2013.01); *H04B 17/27* (2015.01); *G07C 2209/63* (2013.01)

(58) Field of Classification Search
USPC ...... 355/1, 39; 455/26.1, 75; 340/5.62, 5.63, 340/426.36, 426.16, 426.17
See application file for complete search history.

(56) References Cited

U.S. PATENT DOCUMENTS

| | | | | |
|---|---|---|---|---|
| 5,499,022 | A * | 3/1996 | Boschini ...................... | 340/5.62 |
| 6,960,982 | B2 * | 11/2005 | Katou et al. ................. | 340/5.72 |
| 7,515,034 | B2 * | 4/2009 | Inoue ........................... | 340/5.61 |
| 8,077,011 | B2 * | 12/2011 | McBride et al. ............ | 340/5.72 |
| 8,427,276 | B2 * | 4/2013 | McBride et al. ............ | 340/5.64 |
| 8,717,142 | B2 * | 5/2014 | Nagao et al. ................ | 340/5.72 |
| 2004/0130462 | A1 * | 7/2004 | Ueda .................. | G07C 9/00309 340/901 |
| 2005/0162259 | A1 | 7/2005 | Hotta et al. | |
| 2006/0082436 | A1 * | 4/2006 | Kamiya et al. .............. | 340/5.72 |
| 2006/0186993 | A1 | 8/2006 | Inoue | |
| 2007/0268110 | A1 * | 11/2007 | Little .................. | B60R 25/2072 340/5.62 |
| 2008/0106367 | A1 | 5/2008 | Kachouh et al. | |
| 2009/0190635 | A1 * | 7/2009 | Neurohr et al. ............. | 375/219 |
| 2010/0061350 | A1 * | 3/2010 | Flammer, III ............... | 370/338 |
| 2010/0231369 | A1 | 9/2010 | Oya | |

FOREIGN PATENT DOCUMENTS

| | | |
|---|---|---|
| CN | 1637788 A | 7/2005 |
| CN | 101832070 A | 9/2010 |
| EP | 1510835 A1 | 3/2005 |

(Continued)

*Primary Examiner* — Jennifer Mehmood
*Assistant Examiner* — Yong Hang Jiang
(74) *Attorney, Agent, or Firm* — Osha Liang LLP

(57) ABSTRACT

A detection device that detects existence of a radio wave transmitting/receiving body inside a specific space has a first antenna, a second antenna, a controller that controls a first detection signal and a second detection signal that the first antenna transmits to an inside of the specific space, and a disturbing signal that the second antenna transmits, a third antenna that receives a response signal transmitted to the first detection signal and the second detection signal, which have been received by the radio wave transmitting/receiving body, and a determination unit that determines an existence position of the radio wave transmitting/receiving body, based on the response signal received by the third antenna.

20 Claims, 7 Drawing Sheets

(56) References Cited

FOREIGN PATENT DOCUMENTS

| EP | 1632410 | A8 | 5/2006 |
|---|---|---|---|
| EP | 1731699 | A1 | 12/2006 |
| JP | 2004-131974 | A | 4/2004 |
| JP | 2006077408 | A | 3/2006 |
| JP | 2006233533 | A | 9/2006 |
| WO | 2010141033 | A1 | 12/2010 |

* cited by examiner

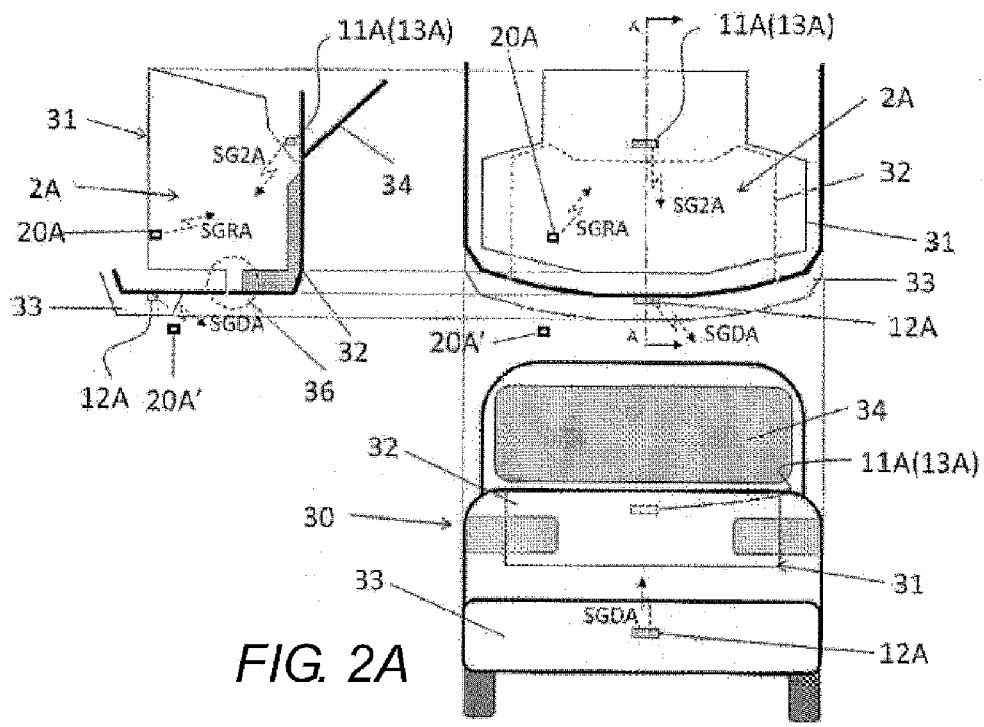
FIG. 2C  FIG. 2B
FIG. 2A
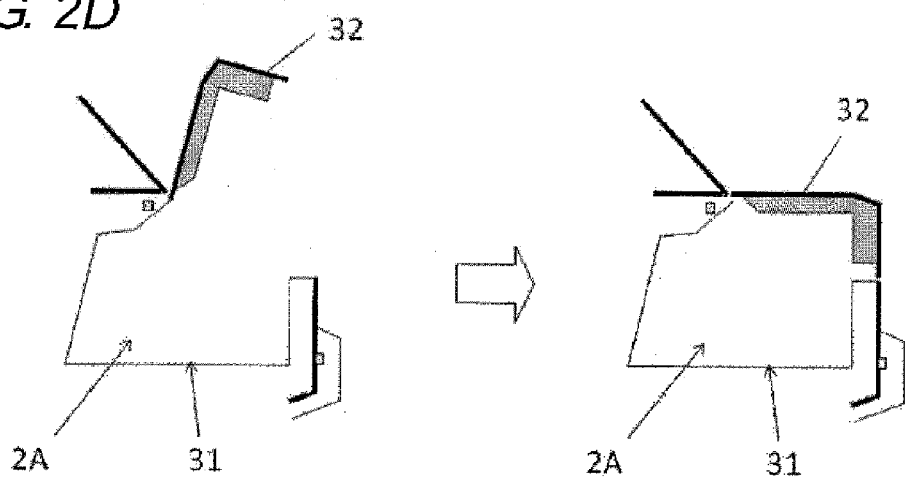
FIG. 2D
IN STATE WHERE TRUNK
IS OPEN
IN STATE WHERE TRUNK
IS CLOSED

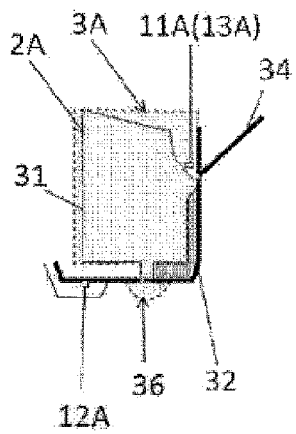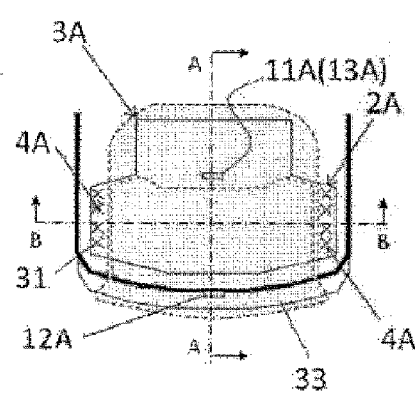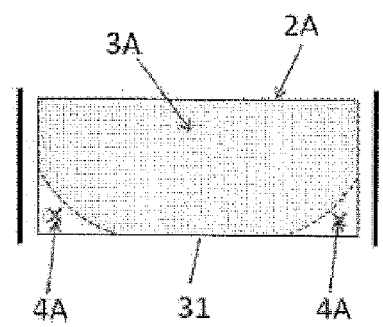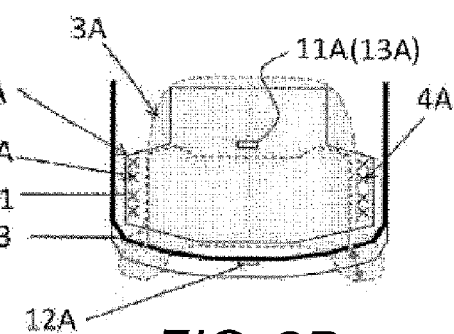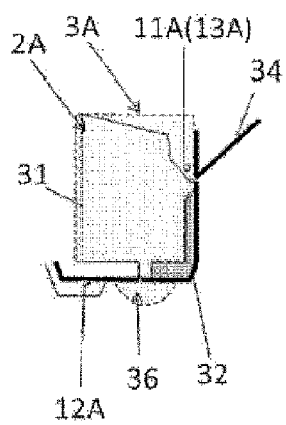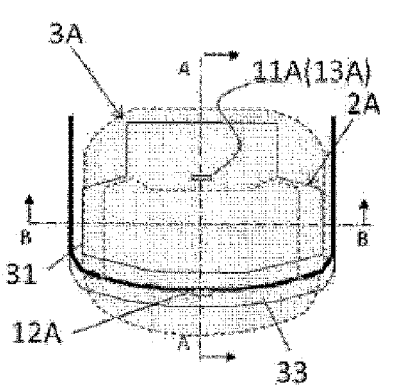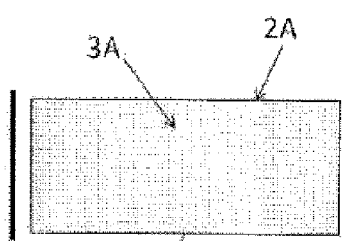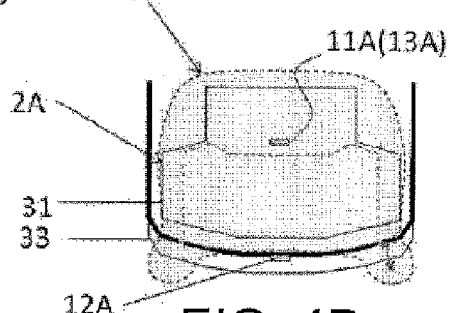

DETECTION DEVICE, DETECTION SYSTEM AND DETECTION METHOD OF RADIO WAVE TRANSMITTING/RECEIVING BODY

BACKGROUND OF THE INVENTION

1. Technical Field

The present invention relates to a detection device, a detection system and a detection method of a radio wave transmitting/receiving body, and particularly to a detection device, a detection system, and a detection method that detect existence of a radio wave transmitting/receiving body in order to prevent a situation where locking is performed, leaving the radio wave transmitting/receiving body in a specific space, so-called containment.

2. Related Art

Recently, an automatic locking function has often been employed to increase assurance and convenience of locking in a vehicle, a building, a locker or the like. Particularly, as represented by a trunk of the vehicle, a mechanism that automatically performs locking at the same time as closing of a door or the like has often been employed. On the other hand, when a key necessary for unlocking is left indoors, a spare key, a specialist for unlocking or the like is needed, and thus, the containment of the key is a consideration on the reverse side of the assurance and convenience of locking.

In recent years, as represented by a keyless entry system of a vehicle, a technique has been known in which transmission and reception of a radio wave are performed between a locking/unlocking control device provided in an object to be locked or unlocked, and a circuit device provided in a key to perform the locking or unlocking of the object. In many of the above-described systems, against the above-described key containment, a signal is transmitted to the key from the locking/unlocking control device to request a return signal from the key and thereby search the key. When it is detected by the search of the key that the key is left inside a space of the object, processing of not performing the locking of the object or the like is often performed. At this time, a situation where the key is not detected although the key is left needs to be prevented. At the same time, a situation where the key is detected in the wrong although the key is not left also needs to be prevented. That is, in order to prevent undetection and false detection, an increase in accuracy of the detection of the key is required.

For example, there are Japanese Unexamined Patent Publication Nos. 2006-77408 and 2006-233533 and the like as the related art that have proposed the containment of the key (portable machine) inside the vehicle or the increase in detection accuracy.

In Japanese Unexamined Patent Publication No. 2006-77408, there is disclosed a locking/unlocking control device for a trunk including a portable machine that records an ID code, which is authentication information specific to a vehicle, an in-trunk transmitter that transmits an in-trunk radio wave to inquire about whether or not the portable machine exists inside a trunk, based on the ID code, a trunk controller that senses/identifies whether the trunk is in an locked state or in an unlocked state, and a smart controller that controls the locking/unlocking of the trunk. The smart controller executes vehicle interior-side processing of checking a history of whether or not the portable machine exists in a vehicle interior at the time of trunk unlocking in accordance with the change from the unlocked state to the locked state of the trunk, and in-trunk search processing. There is disclosed execution of electric processing at the time of containment such as sounding an alarm to inform a user of the containment on condition that it is determined by the vehicle interior-side processing that the portable machine is absent in the vehicle interior, and it is detected by the in-trunk search processing that the portable machine is contained in the trunk.

The technique disclosed in Japanese Unexamined Patent Publication No. 2006-233533 is for a control device to exactly determine whether a portable machine including a radio terminal to which an identification code specific to a vehicle is assigned exists inside or outside the vehicle. In Japanese Unexamined Patent Publication No. 2006-233533, there is a remote operation device for vehicle in which in order to limit a communicable range of the portable machine and a vehicle exterior antenna, which is transmission means, a legitimate identification request radio signal is transmitted from the vehicle exterior antenna as the transmission means outside the vehicle, and at the same time, a disturbing wave to cancel the authentification request radio signal is transmitted from a vehicle interior antenna, which is transmission means inside the vehicle. Transmitting the disturbing wave allows the authentication request radio signal inside the vehicle to be cancelled, so that authentication communication inside the vehicle is not established, but only authentication communication outside the vehicle is established.

SUMMARY

In the related art, on the premise of the portable machine as the key including the specific identification code and the communication function, accuracy of the determination of the containment of the portable machine and determination as to whether or not the portable machine exists inside the vehicle has been increased. However, in some cases, in the detection of the portable machine in an area or in a space to be protected by the locking (e.g., inside a vehicle, inside a building/room, inside a locker), the portable machine cannot be detected although it exists in the area or in the space, or it is detected in the wrong although it does not exist in the area or space.

One or more embodiments of the present invention provides a detection system, a detection device and a detection method that prevent undetection of a portable machine as a key including a specific identification code and a communication function, which portable machine is left in an area or in a space to be protected by locking (hereinafter, referred to as a "specific space"). One or more embodiments of the present invention provides a detection system, a detection device and a detection method that prevent false detection that the key exists inside the specific space although the key exists outside the specific space.

In accordance with one or more embodiments of the present invention, there is provided a detection device that detects existence of a radio wave transmitting/receiving body inside a specific space, including a first antenna, a second antenna, a controller that controls a first detection signal and a second detection signal that the first antenna transmits to an inside of the specific space, and a disturbing signal that the second antenna transmits, a third antenna that receives a response signal transmitted to the first detection signal and the second detection signal, which have been received by the radio wave transmitting/receiving body, and a determination unit that determines an existence position of the radio wave transmitting/receiving body, based on the response signal received by the third antenna, wherein when it is detected that the specific space has become a closed space, the controller performs control so that the second detection signal and the disturbing signal that cancels the second detection signal are simultaneously transmitted at different timing from timing of the transmission of the first detection signal, and when the third antenna receives the response signal to any one of the first detection signal and the second detection signal, the determination unit determines that the radio wave transmitting/receiving body exists inside the specific space.

In accordance with this, the detection device can be provided that prevents undetection of the radio wave transmitting/receiving body existing inside the specific space and prevents false detection of the radio wave transmitting/receiving body outside the specific space.

Furthermore, by adjusting strengths of the first detection signal and the second detection signal, the controller may perform the control so that the first antenna transmits the first detection signal with a first signal strength, and the second detection signal with a second signal strength higher than the first signal strength.

In accordance with this, the detection device that can minutely set a range where the detection signals arrive and the radio wave transmitting/receiving body can receive the detection signals by adjusting the strengths of the detection signals can be provided at a low cost independently of the number and the positions of antennas.

Furthermore, the controller may control the first signal strength so that the radio wave transmitting/receiving body existing in a space outside the specific space at a predetermined distance or more from the specific space does not sense the first detection signal, and so that the radio wave transmitting/receiving body existing in a space inside the specific space where the disturbing signal is sensed senses the first detection signal, and the controller may control the second signal strength so that the radio wave transmitting/receiving body existing in a space outside the specific space where the disturbing signal is not sensed does not sense the second detection signal, and so that the radio wave transmitting/receiving body existing in a space inside the specific space where the first detection signal is not sensed senses the second detection signal.

In accordance with this, the detection device can be provided that surely detects the radio wave transmitting/receiving body inside the specific space, and does not detect the radio wave transmitting/receiving body outside the specific space.

Furthermore, by further adjusting a strength of the disturbing signal, the controller may perform the control so that the radio wave transmitting/receiving body existing in the space inside the specific space where the first detection signal is not sensed does not sense the disturbing signal.

In accordance with this, the detection device can be provided that can highly accurately set the range where the detection signals arrive and the radio wave transmitting/receiving body can receive the detection signals by adjusting the strengths of the disturbing signals.

Furthermore, the specific space may be an internal space of a trunk of a vehicle, the radio wave transmitting/receiving body may be a portable machine to open and close the trunk, and that the specific space becomes a closed space may be that the trunk is closed.

In accordance with this, the detection device can be provided that prevents undetection of the portable machine inside the internal space of the trunk of the vehicle and prevents false detection of the portable machine outside the space.

Furthermore, the second antenna may be attached to a rear bumper outside the vehicle, the first antenna may be attached anterior to the rear bumper, a position of the space inside the specific space where the radio wave transmitting/receiving body does not sense the first detection signal may be laterally both side corners and a bottom vicinity of the trunk, and a position of the space inside the specific space where the radio wave transmitting/receiving body senses the disturbing signal may be substantially at the same height as a height from a bottom of the trunk of a gap between a vehicle body of the vehicle and a lid of the trunk, and may not be the laterally both side corners of the trunk.

In accordance with this, the detection device can be provided that surely detects the portable machine inside the internal space of the trunk of the vehicle, and does not detect the portable machine outside the space.

Furthermore, the first antenna and the third antenna may be made of one antenna.

In accordance with this, the detection device can be provided at a low cost.

In accordance with another aspect, there is provided a detection method for detecting existence of a radio wave transmitting/receiving body inside a specific space, including a first step of detecting that the specific space has become a closed space, a second step of transmitting a first detection signal and a second detection signal at different timing, and transmitting a disturbing signal that cancels a part of the second detection signal simultaneously with the second detection signal, and a third step of determining that the radio wave transmitting/receiving body exists inside the specific space, when a response signal that the radio wave transmitting/receiving body having a specific identification code sends back to any one of the first detection signal and the second detection signal is received. Moreover, in the second step, after the first detection signal is transmitted, the second detection signal may be transmitted. Alternatively, in the second step, after the second detection signal is transmitted, the first detection signal may be transmitted.

In accordance with this configuration, the detection method can be provided in which undetection of the radio wave transmitting/receiving body existing inside the specific space is prevented and false detection of the radio wave transmitting/receiving body outside the specific space is prevented.

Furthermore, the first detection signal may be a signal that the radio wave transmitting/receiving body in one space inside the specific space senses, and that the radio wave transmitting/receiving body in another space does not sense, the second detection signal may be a signal that the radio wave transmitting/receiving body existing inside the specific space senses, and the transmission may be performed so that in the specific space, the space where the radio wave transmitting/receiving body does not sense the first detection signal and the space where the radio wave transmitting/receiving body senses the disturbing signal do not overlap, and so that the space where the radio wave transmitting/receiving body senses the disturbing signal and the space where the radio wave transmitting/receiving body senses the first detection signal overlap.

In accordance with this, the detection method can be provided in which the radio wave transmitting/receiving body inside the specific space is surely detected, and the radio wave transmitting/receiving body outside the specific space is not detected.

Furthermore, the detection method may further include an intermediate determination step of determining whether or not the radio wave transmitting/receiving body exists inside the specific space between the step of transmitting the first detection signal and the step of transmitting the second detection signal, wherein in the intermediate determination step, it is determined that the radio wave transmitting/receiving body exists inside the specific space when a response signal that the radio wave transmitting/receiving body sends back is received, and the subsequent steps are not performed.

In accordance with this, the efficient, quick detection method can be provided.

In accordance with still another aspect, there is provided a detection system including a radio wave transmitting/receiving body having a specific identification code, and a detection device that detects existence of the radio wave transmitting/receiving body inside a specific space, the detection device including a first antenna, a second antenna, a controller that controls a first detection signal and a second detection signal that the first antenna transmits, and a disturbing signal that the second antenna transmits, a third antenna that receives a response signal transmitted by the radio wave transmitting/receiving body, and a determination unit that determines an existence position of the radio wave transmitting/receiving body, based on the response signal received by the third antenna, the radio wave transmitting/receiving body including a reception unit that receives the first detection signal and the second detection signal, and a transmission unit that transmits the response signal to the received first detection signal and second detection signal, wherein when the specific space becomes a closed space, the controller performs control so that the second detection signal and the disturbing signal that cancels the second detection signal are simultaneously transmitted at different timing from timing of the transmission of the first detection signal, and when the third antenna receives the response signal to any one of the first detection signal and the second detection signal, the determination unit determines that the radio wave transmitting/receiving body exists inside the specific space.

In accordance with this, the detection system can be provided that prevents undetection of the radio wave transmitting/receiving body existing inside the specific space and prevents false detection of the radio wave transmitting/receiving body outside the specific space.

As described above, according to one or more embodiments of the present invention, the detection system, the detection device and the detection method can be provided that prevent the undetection of the key existing inside the specific space, the key having the specific identification code and the communication function, and prevent the false detection of the key outside the specific space.

BRIEF DESCRIPTION OF THE DRAWINGS

FIG. 2A is a back diagram of a vehicle, FIG. 2B is a plan diagram of a trunk portion, and FIG. 2C is a cross-sectional diagram along an A-A cross section (when a trunk lid is closed), showing a second embodiment of the present invention;

FIG. 2D is an explanatory diagram showing only the trunk portion to explain that a specific space becomes a closed space in the second embodiment of the present invention;

FIG. 3A is a plan diagram of the trunk portion (No. 1), FIG. 3B is a plan diagram of the trunk portion (No. 2), FIG. 3C is a cross-sectional diagram along a B-B cross section, and FIG. 3D is a cross-sectional diagram along an A-A section, showing a sensing space by a first detection signal in the second embodiment of the present invention;

FIG. 4A is a plan diagram of the trunk portion (No. 1), FIG. 4B is a plan diagram of the trunk portion (No. 2), FIG. 4C is a cross-sectional diagram along the B-B cross section, and FIG. 4D is a cross-sectional diagram along the A-A section, showing a sensing space by a second detection signal in the second embodiment of the present invention;

DETAILED DESCRIPTION

In one or more embodiments of the present invention, when a specific space becomes a closed space, a controller transmits one detection signal to detect a radio wave transmitting/receiving body, another detection signal, and a disturbing signal to cancel this other detection signal at different timing. When the controller receives a response signal from the radio wave transmitting/receiving body to either of these detection signals, it is determined that the radio wave transmitting/receiving body exists inside the specific space.

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
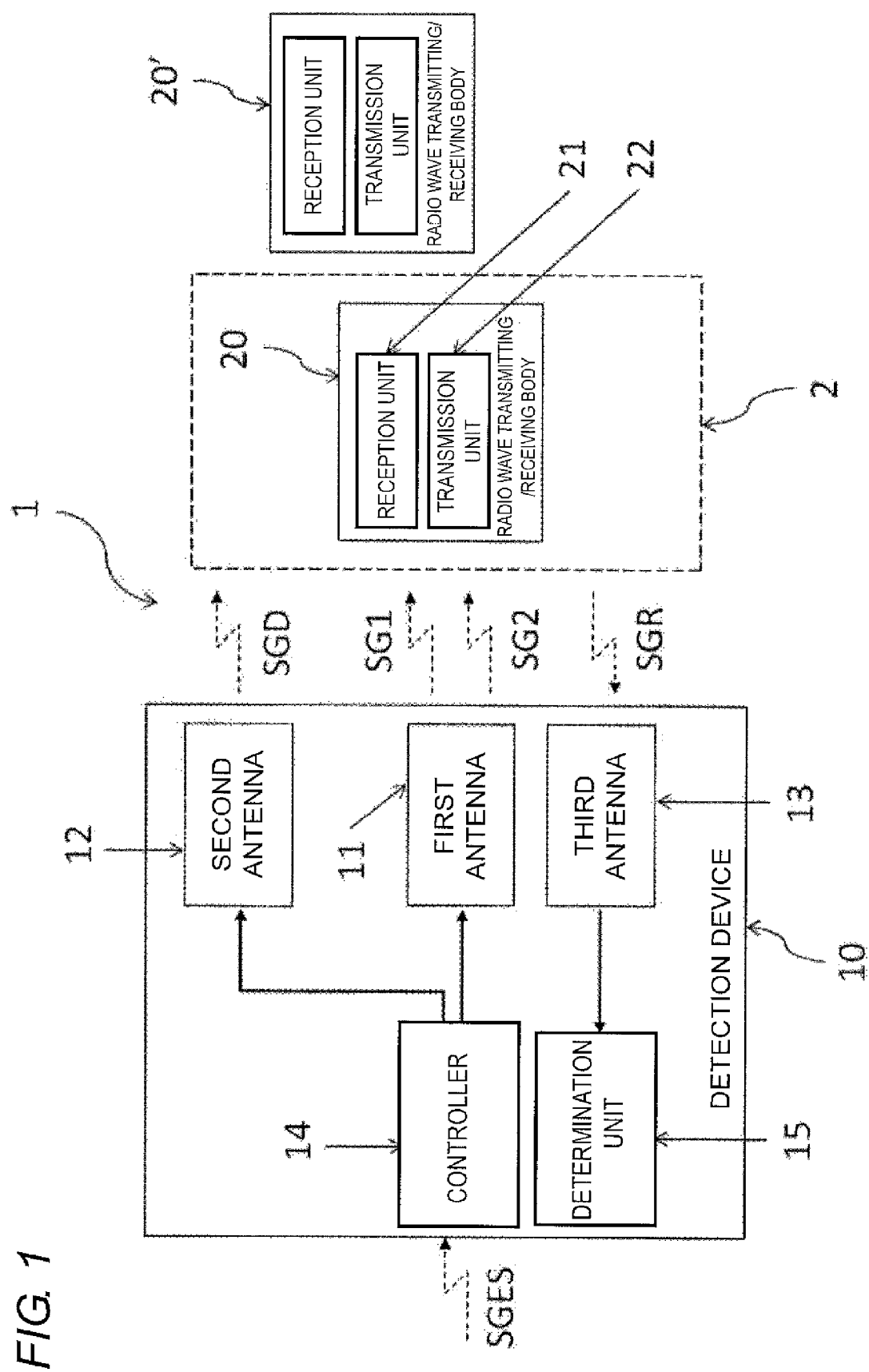
FIG. 1 is a basic configuration block diagram of according to a first embodiment of the present invention.

FIG. 1 shows a basic configuration of a detection system 1 of a first embodiment of the present invention. The detection system 1 includes a radio wave transmitting/receiving body 20 having a specific identification code, and a detection device 10 to detect existence of this radio wave transmitting/receiving body 20.

The radio wave transmitting/receiving body 20 includes a reception unit 21 that receives a first detection signal and a second detection signal transmitted by the detection device 10, a transmission unit 22 that transmits a response signal to the received first detection signal and second detection signal, and when the detection signal transmitted by the detection device 10 is received, the response signal is transmitted to the detection signal together with the specific identification code.

The detection device 10 transmits the detection signal. The radio wave transmitting/receiving body 20, which has received the detection signals, transmits the response signal. When receiving the response signal together with the identification code, the detection device 10 confirms the existence of the radio wave transmitting/receiving body 20 having the identification code and determines that the radio wave transmitting/receiving body 20 exists inside a specific space 2. For example, a radio wave transmitting/receiving body 20' existing inside a remote space that the detection signal does not reach cannot transmit the response signal. Accordingly, the detection device 10 cannot determine that the radio wave transmitting/receiving body 20' exists in the specific space 2.

The detection device 10 includes a first antenna 11, a second antenna 12, a third antenna 13 that receives a response signal SGR transmitted by the radio wave transmitting/receiving body 20, a controller 14 that controls a first detection signal SG1 and a second detection signal SG2 transmitted by the first antenna 11, and a disturbing signal SGD transmitted by the second antenna 12, and a determination unit 15 that determines an existence position of the radio wave transmitting/receiving body 20, based on the response signal SGR received by the third antenna 13.

When receiving a signal SGES indicating that the specific space 2 has become a closed space, the controller 14 performs control so that the second detection signal SG2 and the disturbing signal SGD to cancel the second detection signal SG2 are simultaneously transmitted at different timing from timing of the transmission of the first detection signal SG1, and the first detection signal SG1 and the second detection signal SG2 are transmitted from the first antenna 11, and the disturbing signal SGD is transmitted from the second antenna 12. When the radio wave transmitting/receiving body 20 senses the first detection signal SG1 or the second detection signal SG2, the radio wave transmitting/receiving body 20 transmits the response signal SGR. When the third antenna 13 receives the response signal SGR, the determination unit 15 determines that the radio wave transmitting/receiving body 20 exists inside the specific space 2.

Here, that the specific space 2 becomes a closed space means that the space is put into a state disabled to be physically accessed to an inside from an outside of the specific space 2, and for example, that a door is shut or locked. Moreover, timing of the transmission of the first detection signal SG1 and the timing of the transmission of the second detection signal SG2 and the disturbing signal SGD are different. The detection device 10 may transmit the first detection signal SG1 first, and then transmit the second detection signal SG2 and the disturbing signal SGD. On the contrary, the second detection signal SG2 and the disturbing signal SGD may be transmitted first, and then the first detection signal SG1 may be transmitted.

The controller 14 performs control so that the detection signal to detect the radio wave transmitting/receiving body 20 is divided into the first detection signal SG1 and the second detection signal SG2 to be transmitted in twice. Furthermore, simultaneously with the second detection signal SG2, the disturbing signal is transmitted so as to cancel a part of the second detection signal SG2. Considering that a shape and a size of the specific space are various, there are cases where the existence of the radio wave transmitting/receiving body 20 existing inside the specific space cannot be detected by the detection signal once. That is, there are cases where although the radio wave transmitting/receiving body 20 is contained in the specific space, the radio wave transmitting/receiving body 20 cannot be detected.

On the other hand, transmission of various detection signals may cause the radio wave transmitting/receiving body 20 outside the specific space to be detected in the wrong. That is, there are cases where although the radio wave transmitting/receiving body 20 is outside the specific space without being contained, the radio wave transmitting/receiving body 20 is detected.

As described above, the detection system 1 can be provided in which the detection signals are detected at two levels, and the disturbing signal is transmitted to cancel a part of the one of the detected signals, that is, the detection signal transmitted outside the specific space 2, which prevents undetection of the radio wave transmitting/receiving body 20 existing inside the specific space 2, and prevents false detection of the radio wave transmitting/receiving body 20 outside the specific space 2. The present invention is not limited to the transmission at the two levels, but for example, signal strength of the detection signal and the disturbing signal is varied at multiple levels, so that the detection of the radio wave transmitting/receiving body 20 is performed at two or more multiple levels, such as three or four levels.

While in the present figure, only the radio wave transmitting/receiving body 20 exists inside the specific space 2, the present invention is not limited thereto, but the whole or part of the detection device 10 may be inside the specific space 2. According to one or more embodiments of the present invention, the first antenna 11 that transmits the detection signals to detect the existence of the radio wave transmitting/receiving body 20 inside the specific space 2 is inside the specific space 2, and the second antenna 12 that transmits the disturbing signal not to detect the existence of the radio wave transmitting/receiving body 20 outside the specific space 2 is outside the specific space 2.

While a difference between the first detection signal SG1 and the second detection signal SG2 according to one or more embodiments of the present invention is a difference in signal strength, the present invention is not limited thereto. For example, the plurality of first antennas 11 are provided, and the first detection signal SG1 is transmitted from one of the first antennas 11, while the second detection signal SG2 is transmitted from the different first antennas 11, and further relatively positional relationships between the first antennas 11, and the specific space 2 and the second antenna 12 are considered, by which a similar effect may be exerted.

When in the strength of the signal, the difference is provided between the first detection signal SG1 and the second detection signal SG2, according to one or more embodiments of the present invention, the controller 14 adjusts the strengths of the first detection signal SG1 and the second detection signal SG2, by which the first antenna 11 transmits the first detection signal SG1 with a first signal strength, and the second detection signal SG2 with a second signal strength higher than the first signal strength. Even if the second detection signal SG2 is transmitted with the second signal strength, which is higher, and the second detection signal SG2 reaches the outside of the specific space 2, the disturbing signal SGD cancels the second detection signal SG2 that has reached the outside of the specific space 2, which can prevent the false detection of the radio wave transmitting/receiving body 20 outside the specific space 2.

In this manner, adjusting the strengths of the detection signals enables a range which the detection signals can reach to sense the radio wave transmitting/receiving body to be set minutely.

However, while in the foregoing, the second detection signal SG2 has the signal strength higher than the first signal strength, the present invention is not limited thereto, but the second signal strength may be lower than, or the same as the first signal strength. For example, when it is assumed that the two first antennas are provided, and that in many cases, the radio wave transmitting/receiving body 20 is far from an installation position of one of the first antennas that transmits the first detection signal SG1, and is closer to the other first antenna that transmits the second detection signal SG2, the second signal strength may be lower than the first signal strength.

As to the adjustment of the strength of the detection signals, more specifically, the controller 14 controls the first signal strength so that the radio wave transmitting/receiving body 20 existing in a space outside the specific space 2 at a predetermined distance or more from the specific space 2 is not sensed, and so that the radio wave transmitting/receiving body 20 existing in a space inside the specific space 2 where the disturbing signal SGD is sensed is sensed. In addition, according to one or more embodiments of the present invention, the controller 14 controls the second signal strength so that the radio wave transmitting/receiving body 20 existing in a space outside the specific space 2 where the disturbing signal SGD is not sensed is not sensed, and so that the radio wave transmitting/receiving body 20 existing in a space inside the specific space 2 where the first detection signal SG1 is not sensed is sensed.

This enables the radio wave transmitting/receiving body 20 inside the specific space 2 to be surely detected, and the detection of the radio wave transmitting/receiving body 20 outside the specific space 2 to be inhibited. The above-mentioned predetermined distance refers to an acceptable distance at which the detection signal can leak outside the specific space 2, and is defined in a rule, a standard or the like. For example, it is defined in a performance criterion by an anti-theft evaluation organization (THATCHAM) in Britain, or the like.

Furthermore, according to one or more embodiments of the present invention, the controller 14 adjusts the strength of the disturbing signal SGD to thereby perform control so that the radio wave transmitting/receiving body 20 existing in the space inside the specific space 2 where the first detection signal SG1 is not sensed does not sense the disturbing signal SGD. By doing this, the range where the detection signals arrive, so that the radio wave transmitting/receiving body 20 can be sensed can be set with high accuracy.

Second Embodiment

FIGS. 2A to 2C show one or more embodiments of the present invention, in which the detection device according to one or more embodiments of the present invention is applied to a trunk of a vehicle. That is, the specific space is an internal space 2A of a trunk 31 of a vehicle 30, and the radio wave transmitting/receiving body is a portable machine 20A (20A') that transmits a signal to close or open a latch mechanism of the trunk 31. That the specific space 2A becomes a closed space means that the trunk of the vehicle is put into a closed state from an open state, as shown in FIG. 2D, that is, a trunk lid 32 is closed from an open state, thereby putting the latch mechanism into a locked state.

A second antenna 12A is attached almost in a lateral center of a rear bumper 33 outside the vehicle 30. A first antenna 11A is attached anterior to the rear bumper 33 above the trunk 31, almost in a lateral center of a vehicle interior below a rear glass 34. The first antenna 11A and a third antenna 13A are made of an integrated antenna for use both in transmission and in reception in order to reduce the cost.

Since a vehicle body of the vehicle 30 is normally formed of metal, a radio wave transmitted from the first antenna 11A does not leak from the vehicle interior to a vehicle exterior or from the vehicle exterior to the vehicle interior through the vehicle body. However, the radio wave may leak through a gap 36 between the vehicle body and the trunk lid 32. This gap 36 is a buffer portion formed of rubber or the like to alleviate impact when the trunk lid is closed and to prevent intrusion of water, which is free of metal. In this case, for example, there is a possibility that the portable machine 20A' outside the internal space 2A of the trunk 31 responds to the leaking detection signal, and that it is determined in the wrong that the portable machine 20A' exists inside the internal space 2A although it exists outside the internal space 2A.

On the contrary, a disturbing signal SGDA transmitted by the second antenna 12A set outside the vehicle body may leak into the internal space 2A of the trunk 31 through the gap 36. In this case, for example, the portable machine 20A inside the internal space 2A of the trunk 31 cannot sense a second detection signal SG2A by the leaking disturbing signal SGDA, and cannot transmit a response signal SGRA, thereby disabling the detection although the portable machine 20A exists inside the internal space 2A.

Referring to FIGS. 3A to 6B, the adjustment of the strengths of the detection signals to prevent the above-described false detection and undetection will be described in detail. FIGS. 3A to 3D show a detection signal sensing space 3A and a detection signal non-sensing space 4A by a first detection signal SG1A.

A controller 14A (shown in FIG. 7) adjusts the strength of the first detection signal SG1A, by which positions of spaces where the radio wave transmitting/receiving body 20A does not sense the first detection signal SG1A inside the specific space 2A, that is, the internal space 2A of the trunk 31 are laterally both side corners of the trunk 31 and a vicinity of a bottom of the trunk 31 (indicated by a sign X in FIGS. 3A to 3D).

That is, since the first detection signal SG1A is not accompanied by the disturbing signal, and may leak outside the vehicle from the gap 36, the signal strength (first signal strength) cannot be immoderately made large in order to avoid false detection. This causes a situation where the detection signal is not sufficiently transmitted to the whole area even inside the internal space 2A of the trunk 31, thereby forming the spaces 4A where the detection signal cannot be sensed (detection signal non-sensing spaces), and resulting in the spaces where the portable machine 20A cannot be detected even inside the internal space 2A.

In the second embodiment, since the first antenna 11A that transmits the first detection signal SG1A is attached above the trunk 31, below the rear glass 34 slightly anterior to the central position of the trunk 31, almost in the lateral center of the vehicle interior, spaces having a highest possibility that the first detection signal SG1A does not reach the spaces are indicated by the detection signal non-sensing spaces 4A, that is, spaces that are corners close to vehicle side surfaces of the trunk 31, near the bottom of the trunk 31 (indicated by the signs x in FIGS. 3A to 3D).

In FIGS. 3A to 3D, 3A and 3B both show plan diagrams of the trunk 31 portion. FIG. 3A shows the detection signal sensing space 3A and the detection signal non-sensing spaces 4A around a position where a height from the bottom of the trunk 31 is almost the same as that of the gap 36, and FIG. 3B shows the detection signal sensing space 3A and the detection signal non-sensing spaces 4A at a position where the height from the bottom of the trunk 31 is higher than that of the gap 36. As shown in FIG. 2A, since gaps between the trunk lid 32 and the vehicle body exist on both sides not only in a horizontal direction but in a vertical direction, the first detection signal SG1A also leaks out from the gaps in the vertical direction. As a result, the detection signal sensing space 3A may have a shape as shown in FIG. 3B.

An arrow in a lower right portion of FIG. 3B indicates a predetermined distance at which the detection signal is permitted to leak outside the internal space 2A of the trunk (acceptable distance). That is, it is shown that the detection signal sensing space 3A shown in FIG. 3B where the first detection signal SG1A can be sensed is within the range of the predetermined distance.

FIGS. 4A to 4D show the detection signal sensing space 3A by the second detection signal SG2A. In the second embodiment, by the controller 14A adjusting the strength of the second detection signal SG2A, the first antenna 11A transmits the second detection signal SG2A with the second signal strength higher than the first signal strength of the first detection signal SG1A. The signal strength is high enough to make the whole internal space 2A of the trunk 31 into the detection signal sensing space 3A, where the detection signal non-sensing space does not exist in the internal space 2A. As a result, since the portable machine 20A inside the trunk 31 never fails to transmit the response signal SGRA, a determination unit 15A (shown in FIG. 7) can determine that the portable machine 20A exists inside the internal space 2A of the trunk 31.

On the other hand, since the second signal strength is higher than the first signal strength, the detection signal sensing space 3A by the second detection signal SG2A leaks out beyond the predetermined distance where the detection signal is permitted to leak outside the internal space 2A of the trunk 31 (acceptable distance). This allows the portable machine 20A existing outside the internal space 2A of the trunk 31 as well to transmit the response signal SGRA. As a result, the determination unit 15A determines in the wrong that the portable machine 20A exists inside the internal space 2A of the trunk 31. In order to prevent this, the disturbing signal SGDA is transmitted from the second antenna 12A simultaneously with the second detection signal SG2A.

Figure 5A:
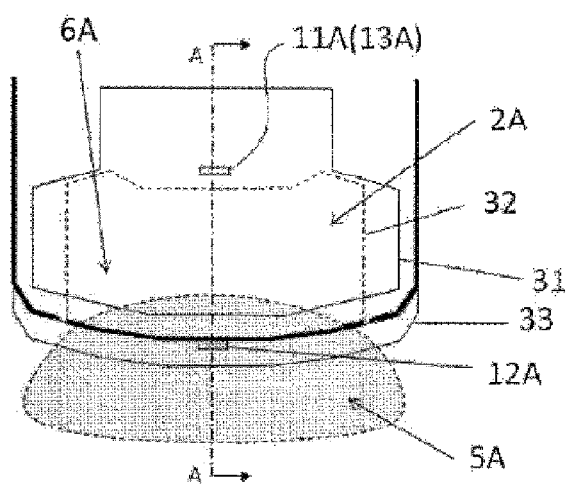
FIG. 5A is a plan diagram of the trunk portion.
Figure 5B:
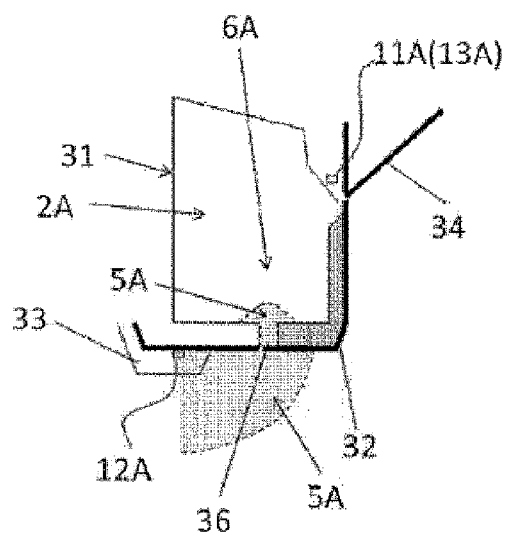
FIG. 5B is a cross-sectional diagram along the A-A cross section, showing a reception space of a disturbing signal in the second embodiment of the present invention.

FIGS. 5A and 5B show a space where the disturbing signal SGDA cancels the second detection signal SG2A, that is, a disturbing signal receiving space 5A. In other words, FIGS. 5A and 5B show a disturbing signal non-receiving space 6A. Since the second antenna 12A is attached around the lateral center of the rear bumper 33 outside the vehicle, the disturbing signal receiving space 5A spreads widely and laterally symmetrically outside the internal space 2A of the trunk 31. On the other hand, the disturbing signal SGDA also leaks into the internal space 2A of the trunk 31 through the gap 36. Specifically, a position of a space where the portable machine 20A in the specific space 2A, which is the internal space of the trunk 31, senses the disturbing signal SGDA is almost at the same height as the height from the bottom of the trunk 31 of the gap 36 between the vehicle body and the trunk lid 32 of the vehicle 30 in the vertical direction, and a spread of a lateral width of the gap 36, which does not include the lateral both side corners of the trunk 31, in the horizontal direction.

Figure 6A:
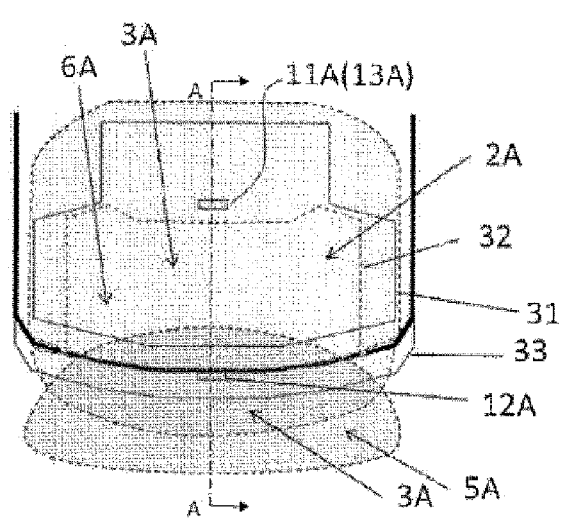
FIG. 6A is a plan diagram of the trunk portion.
Figure 6B:
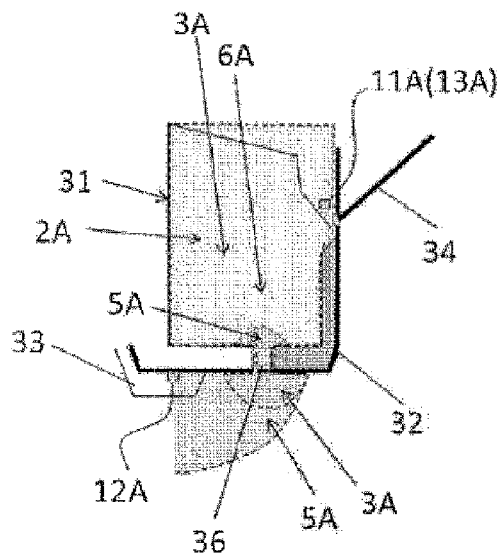
FIG. 6B is a cross-sectional diagram along the A-A cross section, showing the sensing space by the second detection signal and the reception space of the disturbing signal in the second embodiment of the present invention.

FIGS. 6A and 6B simultaneously show the detection signal sensing space 3A by the second detection signal SG2A shown in FIGS. 4A to 4D and the disturbing signal receiving space 5A of the disturbing signal SGDA shown in FIGS. 5A and 5B, in which it is indicated that the disturbing signal receiving space 5A formed by the disturbing signal SGDA cancels the detection signal sensing space 3A outside the vehicle formed by the second detection signal SG2A leaking out from the internal space 2A of the trunk 31. As a result, the portable machine 20A does not transmit the response signal SGRA, so that the determination unit 15A does not determine in the wrong that the portable machine 20A exists inside the internal space 2A of the trunk 31.

On the other hand, the disturbing signal SGDA leaking into the internal space 2A of the trunk 31 also cancels the second detection signal SG2A inside the internal space 2A of the trunk 31. However, since this space overlaps the detection signal sensing space 3A by the first detection signal SG1A, even if the portable machine 20A exists in this space, the portable machine 20A advantageously transmits the response signal SGRA to the first detection signal SG1A. Accordingly, the signal strength of the first detection signal SG1A or the disturbing signal SGDA according to one or more embodiments of the present invention is adjusted lest the disturbing signal receiving space 5A by the disturbing signal SGDA leaking into the internal space 2A of the trunk 31 and the detection signal non-sensing spaces 4A by the first detection signal SG1A should overlap.

In the second embodiment, for example, the control is performed so that the disturbing signal receiving space 5A is located in a space away from both sides of the trunk 31 (side surfaces of the vehicle body) in the vicinity of the gap 36 without reaching the bottom of the trunk 31. Thereby, the disturbing signal receiving space 5A does not overlap the detection signal non-sensing spaces 4A by the first detection signal SG1A, which are the corners close to the vehicle side surfaces of the trunk 31 and the spaces near the bottom of the trunk 31, and thus, the undetection of the portable machine 20A in the internal space 2A of the trunk 31 can be surely prevented.

Figure 7:
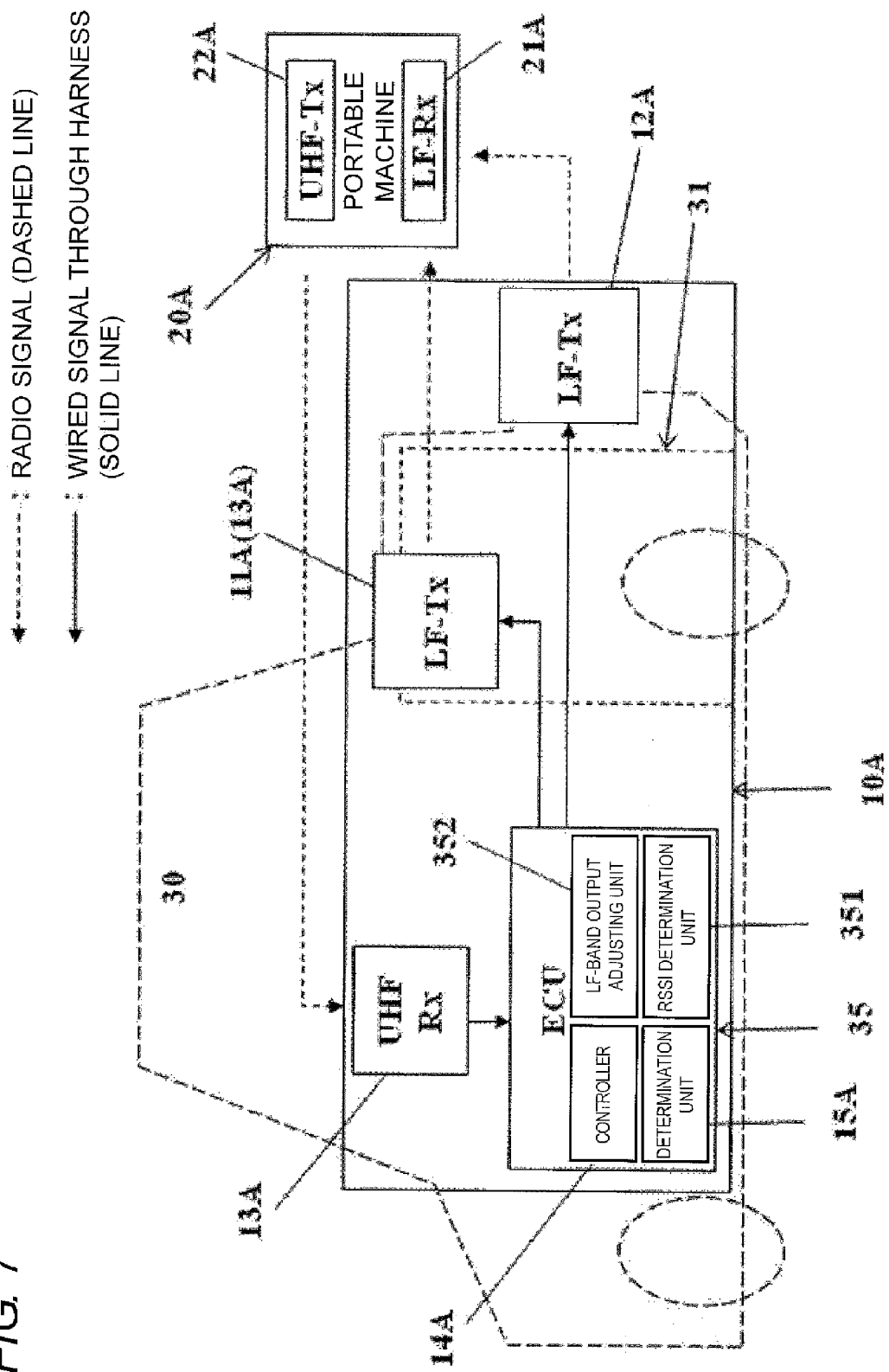
FIG. 7 is a system block diagram in the second embodiment of the present invention.

FIG. 7 is a system block diagram showing main components in the second embodiment, and referring to this figure, a more detailed description will be given. When a user of the vehicle 30 closes the trunk lid (lid of the trunk), the latch mechanism is put into a locked state without requiring transmission of a locking signal or the like from the portable machine, and thus, the trunk 31 is automatically put into the locked state, thereby brings a trunk interior into a closed space. In order to unlock the trunk in the above-described locked state, the portable machine 20A having the specific identification code corresponding to the present vehicle is required. The user operates the portable machine 20A to transmit an unlocking signal, and when authentication of the portable machine 20A is established, the trunk is unlocked, that is, the latch mechanism retaining the state where the trunk is closed is released, thereby bringing about a state where the trunk is open.

The "authentication of the portable machine" when the trunk is unlocked indicates that after the trunk unlocking signal is received from the portable machine 20A, or after the operation to unlock the trunk through a push button or the like provided in the trunk is detected and the signal transmitted from the portable machine 20A is received, it is confirmed that the identification code given to the signal is legitimate.

With closing of the trunk by the user used as a trigger, a radio wave of an LF band is radiated from the first antenna 11A as the first detection signal SG1A with the signal strength adjusted by an LF-band output adjusting unit 352 of the controller 14A included in an ECU 35 of the detection device 10A. A reception unit 21A of the portable machine 20A receives the radiation of this radio wave of the LF band, and a transmission unit 22A of the portable machine 20A transmits a radio wave of a UHF band as the response signal SGRA. Upon receiving the response signal SGRA, a third antenna 13A of the detection device 10A passes it on to the determination unit 15A included in the ECU 35, and the determination Unit 15A determines the position of the portable machine 20A, based on the reception of the response signal SGRA.

Since in the LF band, a wave length is long, and in the distance order in the neighborhood of the vehicle, a radiation strength is reduced (inversely proportional to the cube of the distance) more rapidly than that of the UHF band, the sensing spaces of the detection signals are formed by the radio wave of the LF band. Moreover, an LF strength (RSSI: Receive Signal Strength Indication) is measured on the portable machine 20A side, and LF strength information is carried on the UHF response to inform the detection device 10A side, so that an RSSI value determination unit 351 determines the position.

Moreover, similarly, the disturbing signal SGDA, which is the radio wave of the LF band, is radiated from the second antenna included in the bumper outside the vehicle. The strength is also adjusted by the LF-band output adjusting unit 352 to vary a size of the communication inhibiting space with respect to the disturbing signal SGDA. Whether or not the communication between the vehicle and the portable machine is enabled depends on strength balance (a strength relationship) between both the detection signal and the disturbing signal, and an element of the sensing space formation is different from the foregoing LF strength (RSSI). At the time of radiation of the disturbing signal, both the LF strength (RSSI) and the strength relationship in the disturbing signal are compounded, and the sensing space or the non-sensing space is formed. Duty adjustment of the disturbing signal is means for the LF-band output strength adjustment, and varying a frequency component to be applied to the antenna having frequency characteristics increases or decreases the LF radiation strength.

Third Embodiment

Figure 8:
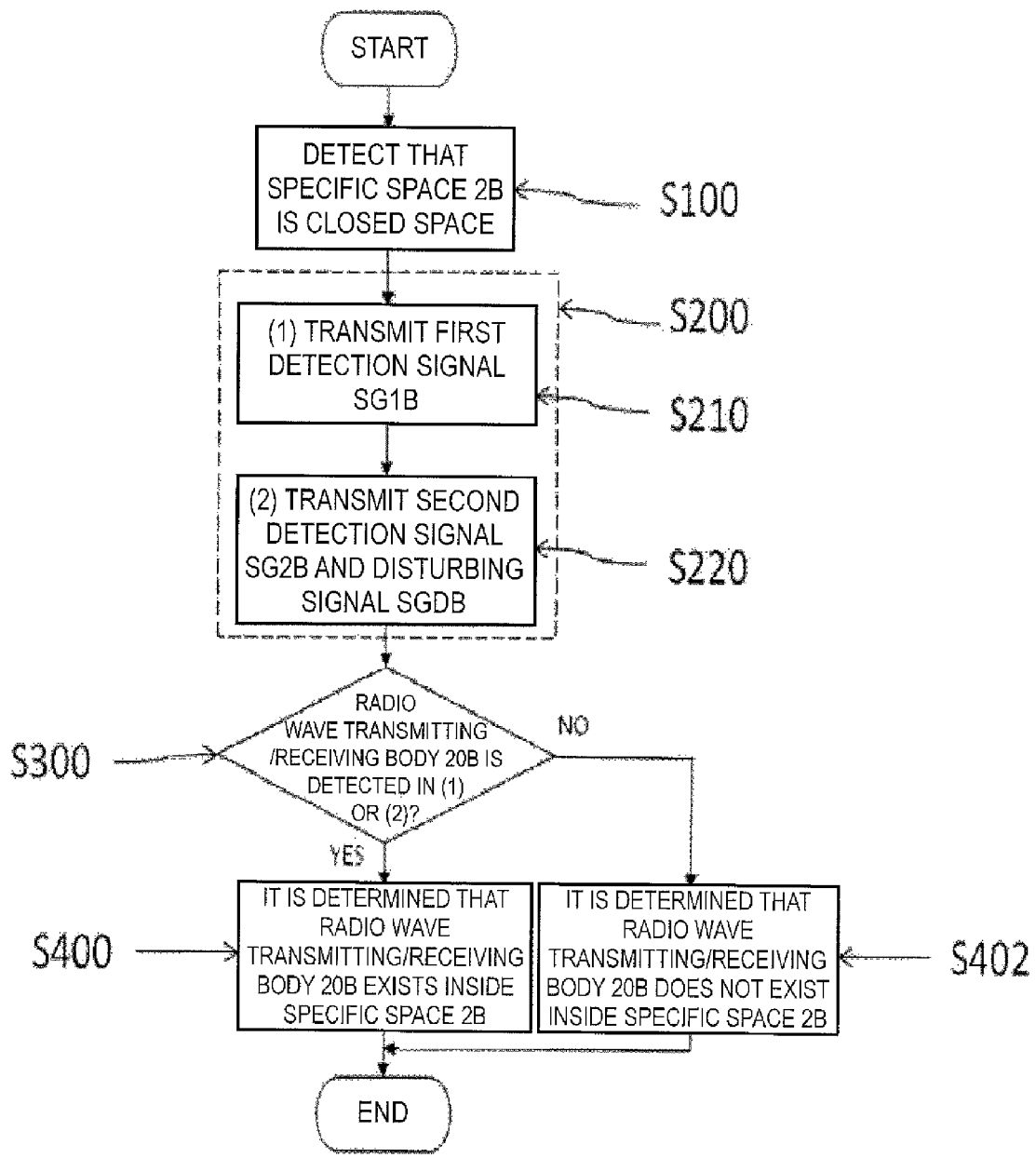
FIG. 8 is a flowchart in a third embodiment of the present invention (No. 1)

FIG. 8 shows a flowchart regarding an embodiment of a detection method for detecting the existence of the radio wave transmitting/receiving body inside the specific space, according to one or more embodiments of the present invention. In the flowchart, "S" denotes a step of processing.

First, as the first step, it is detected that a specific space 2B, which is a space to be protected by locking, has become a closed space (S100). Following the expression in the second embodiment, it is detected that the trunk lid is closed (the latch mechanism is put into the locked state).

Next, as the second step, a first detection signal SG1B and a second detection signal SG2B are transmitted at different timing, and a disturbing signal SGDB to cancel a part of the second detection signal SG2B is transmitted simultaneously with the second detection signal SG2B (S200). While in the present figure, the first detection signal SG1B is transmitted (S210) and then, the second detection signal SG2B is transmitted (S220), instead, the second detection signal SG2B may be transmitted (S220) and then, the first detection signal SG1B may be transmitted (S210). Moreover, the first detection signal SG1B and the second detection signal SG2B may be transmitted with different signal strengths.

Next, as the third step, if the response signal SGR that a radio wave transmitting/receiving body 20B having a specific identification code sends back to either the first detection signal SG1B or the second detections signal SG2B is sensed, it is determined that the radio wave transmitting/receiving body 20B exists inside the specific space 2 (S300, S400). On the contrary, if the response signal SGR is not sensed to either the first detection signal SG1B or the second detection signal SG2B, it is determined that the radio wave transmitting/receiving body 20B does not exist in the specific space 2B (S300, S402). Thereby, the detection method for preventing undetection of the radio wave transmitting/receiving body 20B left inside the specific space 2B, and preventing false detection of the radio wave transmitting/receiving body 20B outside the specific space 2B can be provided.

Normally, after S400, the specific space 2B, which has become a closed space, will be again made into an open space. For example, in the third embodiment, the closed trunk lid 32 is unlocked (the latch mechanism is released). Moreover, after S402, nothing is performed because the radio wave transmitting/receiving body 20B is not left inside the specific space 2B.

Figure 9:
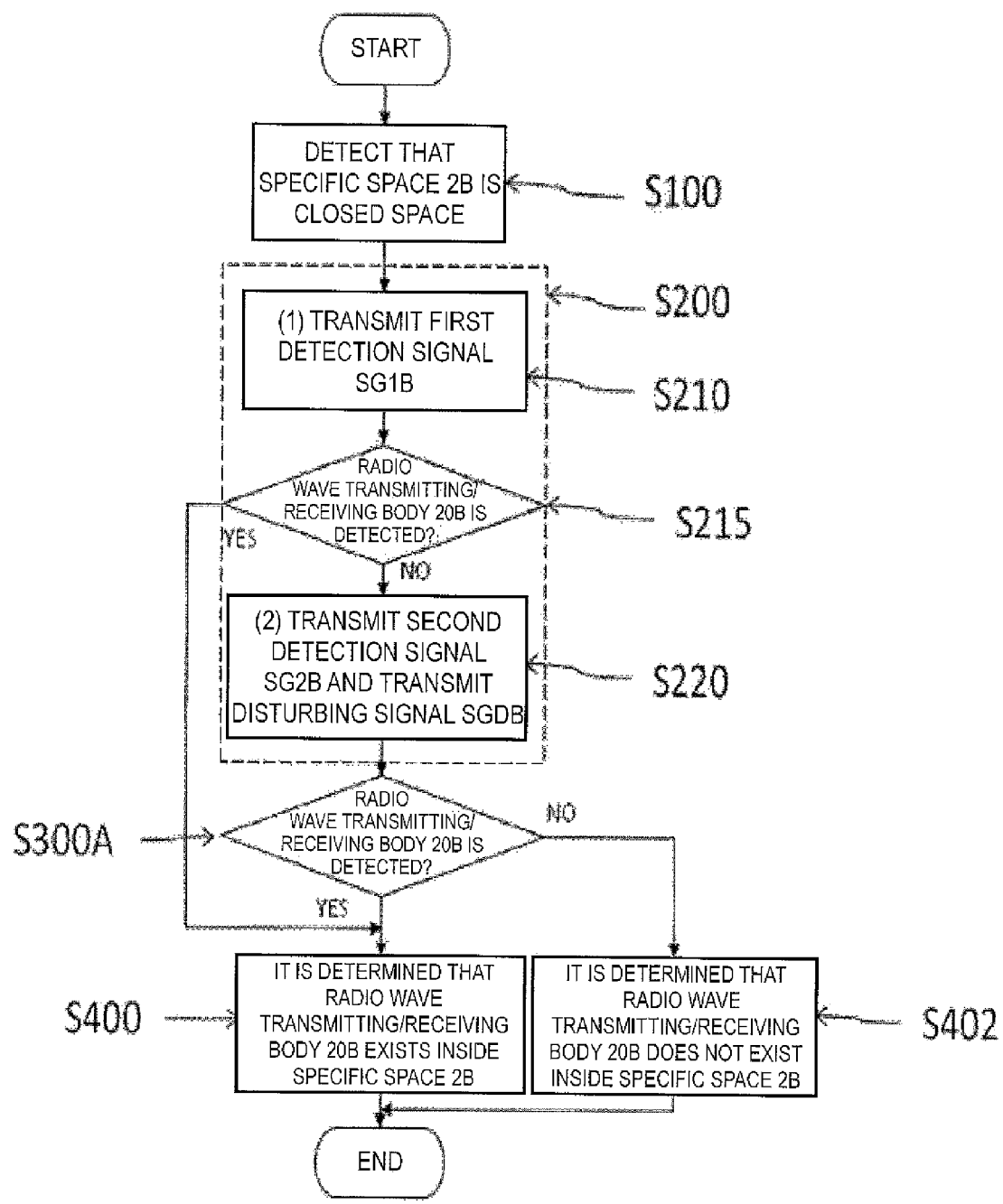
FIG. 9 is a flowchart in the third embodiment of the present invention (No. 2).

FIG. 9 is a flowchart of a modification of the third embodiment of the above-described detection method. The same parts as the foregoing will be omitted and only different parts will be described.

Between the step in which the first detection signal is transmitted (S210) and the step in which the second detection signal is transmitted (S220), that is, after S210, an intermediate determination step in which it is determined whether or not the radio wave transmitting/receiving body 20B exists inside the specific space 2B (S215) is further provided. In the intermediate determination step (S215), if the response signal SGR sent back by the radio wave transmitting/receiving body 20B is sensed, it is determined that the radio wave transmitting/receiving body 20B exists inside the specific space 2B, and the subsequent steps are not performed. That is, if the response signal SGR is not detected, S220 is performed, while if the response signal SGR is detected, S220 is not performed, and it is determined that the radio wave transmitting/receiving body 20B exists inside the specific space 2B (S400). This allows the efficient, quick detection method to be provided.

While one or more embodiments of the present invention being applied to the trunk of the vehicle have been described, obviously, the present invention is not limited thereto. For example, one or more embodiments of the present invention can be applied to the vehicle itself, a building or a room, a locker or the like. In the case of the vehicle itself, the specific space refers to an internal space of the vehicle (vehicle interior), the radio wave transmitting/receiving body is the portable machine, and that the specific space becomes a closed space means that all doors are locked (automatically locked).

Moreover, in the case of a building, for example, one or more embodiments of the present invention can be applied to a garage with a shutter or the like. In this case, the specific space is an internal space of the garage, the radio wave transmitting/receiving body is a portable machine used as a key of the shutter, and that the specific space becomes a closed space means that the garage is shuttered and locked (automatically locked). Moreover, according to one or more embodiments of the present invention, the first antenna that transmits the first detection signal and the second detection signal is installed in the back of the garage, and that the second antenna that transmits the disturbing signal is installed outside the shutter. Moreover, in the case where the shutter is made of metal and has no gap, the first antenna may be installed inside the shutter and in front of the garage.

In the case where one or more embodiments of the present invention is applied to a locker, the specific space is an internal space of the locker, the radio wave transmitting/receiving body is a portable machine used as a key of the locker, and that the specific space becomes a closed space means that a door of the locker is closed to be automatically locked. That is, one or more embodiments of the present invention can be applied to a place or an object that is automatically locked even when the portable machine for locking is left therein.

The present invention is not limited to the exemplified embodiments, but can be carried out with a configuration in a range not departing from the contents of claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A detection device that detects existence of a radio wave transmitting/receiving body inside a specific space, comprising:
    a first antenna;
    a second antenna;
    a controller that controls a first detection signal and a second detection signal that the first antenna transmits to an inside of the specific space, and a disturbing signal that the second antenna transmits;
    a third antenna that receives a response signal transmitted in response to the first detection signal and the second detection signal, which have been received by the radio wave transmitting/receiving body; and
    a determination unit that determines an existence position of the radio wave transmitting/receiving body, based on the response signal received by the third antenna;
    wherein, when the specific space is detected as a closed space, the controller performs control so that the second detection signal and the disturbing signal that cancels the second detection signal are simultaneously transmitted at different timing from timing of the transmission of the first detection signal, and
    wherein, when the third antenna receives the response signal to one of the first detection signal and the second detection signal, the determination unit determines that the radio wave transmitting/receiving body exists inside the specific space.

2. The detection device according to claim 1, wherein by adjusting strengths of the first detection signal and the second detection signal, the controller performs the control so that the first antenna transmits the first detection signal with a first signal strength, and the second detection signal with a second signal strength higher than the first signal strength.

3. The detection device according to claim 2, wherein
    the controller controls the first signal strength so that the radio wave transmitting/receiving body existing in a first space outside the specific space at a predetermined distance or more from the specific space does not sense the first detection signal, and so that the radio wave transmitting/receiving body existing in a second space inside the specific space where the disturbing signal is sensed senses the first detection signal, and
    the controller controls the second signal strength so that the radio wave transmitting/receiving body existing in the first space outside the specific space where the disturbing signal is not sensed does not sense the second detection signal, and so that the radio wave transmitting/receiving body existing in a second space inside the specific space where the first detection signal is not sensed senses the second detection signal.

4. The detection device according to claim 3, wherein by further adjusting a strength of the disturbing signal, the controller performs the control so that the radio wave transmitting/receiving body existing in the second space inside the specific space where the first detection signal is not sensed does not sense the disturbing signal.

5. The detection device according to claim 1, wherein
    the specific space is an internal space of a trunk of a vehicle;
    the radio wave transmitting/receiving body is a portable machine to open and close the trunk; and
    the specific space becomes the closed space when the trunk is closed.

6. The detection device according to claim 5, wherein
    the second antenna is attached to a rear bumper outside the vehicle;
    the first antenna is attached anterior to the rear bumper;
    a position of the second space inside the specific space where the radio wave transmitting/receiving body does not sense the first detection signal is laterally both side corners and a bottom vicinity of the trunk; and
    a position of the second space inside the specific space where the radio wave transmitting/receiving body senses the disturbing signal is substantially at the same height as a height from a bottom of the trunk of a gap between a vehicle body of the vehicle and a lid of the trunk, and not laterally both side corners of the trunk.

7. The detection device according to claim 1, wherein the first antenna and the third antenna are made of one antenna.

8. A detection method for detecting existence of a radio wave transmitting/receiving body inside a specific space, comprising:
    detecting that the specific space has become a closed space;
    transmitting a first detection signal and a second detection signal at different timing by a first antenna, and transmitting a disturbing signal that cancels a part of the second detection signal simultaneously with the second detection signal by a second antenna; and
    determining that the radio wave transmitting/receiving body exists inside the specific space, when a response signal that the radio wave transmitting/receiving body having a specific identification code sends back in response to one of the first detection signal and the second detection signal is received.

9. The detection method according to claim 8, wherein in the transmitting the first detection signal and the second detection signal the second detection signal is transmitted after the first detection signal is transmitted.

10. The detection method according to claim 8, wherein in the transmitting the first detection signal and the second detection signal, the first detection signal is transmitted after the second detection signal is transmitted.

11. The detection method according to claim 8, wherein
    the first detection signal is a signal that the radio wave transmitting/receiving body in one space inside the specific space senses, and that the radio wave transmitting/receiving body in another space does not sense;
    the second detection signal is a signal that the radio wave transmitting/receiving body existing inside the specific space senses.

12. The detection method according to claim 9, further comprising:
    an intermediate determination step of determining whether or not the radio wave transmitting/receiving body exists inside the specific space between the step of transmitting the first detection signal and the step of transmitting the second detection signal;

wherein the intermediate determination step comprises determining that the radio wave transmitting/receiving body exists inside the specific space when a response signal that the radio wave transmitting/receiving body sends back is received, and the subsequent steps are not performed.

13. A detection system comprising a radio wave transmitting/receiving body having a specific identification code, and a detection device that detects existence of the radio wave transmitting/receiving body inside a specific space:

the detection device comprising:
 a first antenna;
 a second antenna;
 a controller that controls a first detection signal and a second detection signal that the first antenna transmits, and a disturbing signal that the second antenna transmits;
 a third antenna that receives a response signal transmitted by the radio wave transmitting/receiving body; and
 a determination unit that determines an existence position of the radio wave transmitting/receiving body, based on the response signal received by the third antenna;

the radio wave transmitting/receiving body comprising:
 a reception unit that receives the first detection signal and the second detection signal; and
 a transmission unit that transmits the response signal in response to the received first detection signal and second detection signal, wherein,
 when the specific space becomes a closed space, the controller performs control so that the second detection signal and the disturbing signal that cancels the second detection signal are simultaneously transmitted at different timing from timing of the transmission of the first detection signal, and
 when the third antenna receives the response signal to one of the first detection signal and the second detection signal, the determination unit determines that the radio wave transmitting/receiving body exists inside the specific space.

14. The detection device according to claim 2, wherein the specific space is an internal space of a trunk of a vehicle;
the radio wave transmitting/receiving body is a portable machine to open and close the trunk; and
the specific space becomes a closed space when the trunk is closed.

15. The detection device according to claim 3, wherein the specific space is an internal space of a trunk of a vehicle;
the radio wave transmitting/receiving body is a portable machine to open and close the trunk; and
the specific space becomes a closed space when the trunk is closed.

16. The detection device according to claim 4, wherein the specific space is an internal space of a trunk of a vehicle;
the radio wave transmitting/receiving body is a portable machine to open and close the trunk; and
the specific space becomes a closed space when the trunk is closed.

17. The detection device according to claim 2, wherein the first antenna and the third antenna are made of one antenna.

18. The detection device according to claim 3, wherein the first antenna and the third antenna are made of one antenna.

19. The detection device according to claim 4, wherein the first antenna and the third antenna are made of one antenna.

20. The detection device according to claim 5, wherein the first antenna and the third antenna are made of one antenna.

* * * * *